United States Patent [19]

Walker et al.

[11] Patent Number: 4,921,689
[45] Date of Patent: May 1, 1990

[54] PROCESS FOR PRODUCING BETA MANGANESE DIOXIDE

[75] Inventors: Andre Walker, Lexington, Mass.; Terrence F. Reise, Winston-Salem, N.C.

[73] Assignee: Duracell Inc., Bethel, Conn.

[21] Appl. No.: 211,309

[22] Filed: Jun. 24, 1988

[51] Int. Cl.$^5$ .................. C01G 45/02; H01M 4/50
[52] U.S. Cl. ........................... 423/605; 429/224
[58] Field of Search .................. 429/224; 423/605

[56] References Cited

U.S. PATENT DOCUMENTS 3,301,634  1/1967  Fuller ........................ 423/605 X
4,133,856  1/1979  Ikeda et al. ................. 423/605 X
4,405,699  9/1983  Kruger ....................... 423/605 X
4,662,065  5/1987  Marincic et al. ............. 423/605 X Primary Examiner—Stephen J. Kalafut
Attorney, Agent, or Firm—Ronald S. Cornell; James B. McVeigh

[57] ABSTRACT

The present invention relates to an improved process for producing beta manganese dioxide and for producing cathodes from said manganese dioxide. The process comprises heating gamma manganese dioxide at at least 450° C. for up to one hour in order to convert a majority of the gamma manganese dioxide to the beta phase without forming detrimental amounts of lower oxides.

17 Claims, 2 Drawing Sheets

PROCESS FOR PRODUCING BETA MANGANESE DIOXIDE

This invention relates to an improved process for producing beta manganese dioxide. In particular, the present invention relates to a method for converting gamma manganese dioxide to the beta crystal phase in very short time periods and using said beta manganese dioxide as a cathode active material in non-aqueous cells.

Manufacturers of manganese dioxide generally use an electrolytic, aqueous process which produces manganese dioxide having a gamma crystal structure. It has long been known that before gamma manganese dioxide can be used as cathode material in a lithium cell the manganese dioxide must be heated to remove water and to change the crystal structure from the gamma phase to a predominantly beta phase. U.S. Pat. Nos. 4,133,856 and 4,297,231 disclose heat treatments of manganese dioxide at between 250° C. and 430° C. for at least two hours to remove water and convert to the beta crystal phase. Heat treatment periods of as long as 20 hours have been used by some manufacturers (see "8. Lithium-Manganese Dioxide Cells", by H. Ikeda, p. 173, *Lithium Batteries*, ed. J. P. Gabano, Academic Press, (N.Y. 1983)). Heretofore, it has been the practice not to exceed a temperature of 450° C. because a decomposition of the manganese dioxide to lower oxides was known to occur. In fact, U.S. Pat. No. 4,133,856, teaches that heat treatment above 430° C. produces $Mn_2O_3$, which material adversely impacts the utilization of the manganese dioxide cathode. FIGS. 1 and 2 of that reference show a decrease in utilization for heat treatments above 375° C.

The problem with the aforementioned heat treatments is that the time required at the specified temperatures is too long for high volume cell production. The prior art methods would require a large number of ovens to produce the amount of material needed. Thus, there is a need to shorten the several hour heat treatment processes of the prior art to shorter time periods.

The use herein of phrases such as "beta manganese dioxide" and "beta converted", etc. is not intended to mean that the gamma manganese dioxide has been converted to 100% beta. Rather, it is intended to mean that the manganese dioxide has been heat treated to convert a majority of the gamma crystal phase to the beta crystal phase. In fact, as will be discussed below, it is preferred that the manganese dioxide is less than 100% beta so that the "beta manganese dioxide" discussed herein is in reality a gamma-beta "mix".

It is therefore an object of the present invention to provide a process for heat treating manganese dioxide in a short period of time to obtain a beta manganese dioxide which behaves similarly in a cell to manganese dioxide heated according to prior art methods. It is an additional object to provide a method which continuously produces said manganese dioxide.

The present invention is based on the discovery that temperatures at and above about 450° C. can be used without detrimentally affecting cell performance because the rate of the gamma to beta conversion of manganese dioxide is so much faster than the rate of decomposition of manganese dioxide to lower oxides that it is possible, in accordance with the present invention to convert the gamma $MnO_2$ to beta by heating particulate gamma manganese dioxide above 450° C. for only a fraction of an hour whereby minimal decomposition to lower oxides occurs.

There are three time segments which make up the total heat treatment period (1) the rise time to heat the $MnO_2$ from ambient to the heat treatment temperature, $t_r$; (2) the time at the heat treatment temperature, $t_h$; and (3) the time to cool the $MnO_2$ from the heat treatment temperature to ambient, $t_c$. In order to minimize the total heat treatment period it is important to have a very short $t_r$ and $t_c$. In this manner $t_h$ becomes the controlling time period for the overall heat treatment process.

Gamma $MnO_2$ is available as a finely divided powder. In order to have a very short $t_r$ it is necessary to have a very effective transfer of heat from the heating oven to the individual particles of the $MnO_2$ powder. Further, the entire mass of $MnO_2$ must be heated in a uniform manner in order to obtain a homogeneous beta conversion. According to the present invention, a method for providing very rapid, uniform heating comprises passing the $MnO_2$ powder through a multi-zoned rotary tube furnace (also known as a rotary kiln or a rotary dryer).

The features and advantages of the present invention will be discussed below with reference to the Figures in which.

A rotary tube furnace comprises an elongated, rotatable, steel tube with heating elements arranged adjacent to a portion of the external surface of the tube for applying heat thereto. The tube generally declines downwardly from the end where the powder is introduced to the end where the powder exits. The powder is continuously fed into one end and tumbles down the length of the tube as it slowly rotates. The rotation of the tube provides very effective heat transfer to the powder because the powder is in continuous motion and the particles in contact with the heated tube surface are constantly changing. The result is a very short $t_r$. Once the powder has reached the heat treatment temperature the powder tumbles through the remainder of the heated zone in a time equal to $t_h$. The powder then passes into a cool down zone and exits the tube.

For example, a rotary tube furnace obtained from Harper Electric Furnace Inc., Lancaster, N.Y., is suitable to heat treat gamma manganese dioxide for conversion to a predominantly beta crystal phase. The rotary tube furnace has a stainless tube that is about 11.5 feet long and 7 inches in diameter. The tube has an essentially smooth inner surface. The decline of the tube can be varied from 0–5 degrees. The tube can be rotated from 0 to 18 RPM. The time of passage of manganese dioxide through the tube is determined by the angle of decline and the RPM used. The furnace has three independent, consecutive heating zones, each being two feet long. The first zone begins two feet down the tube such that the last zone ends eight feet down the tube length. Thus, the last 3.5 feet of the tube are the cool down zone.

Figure 1:
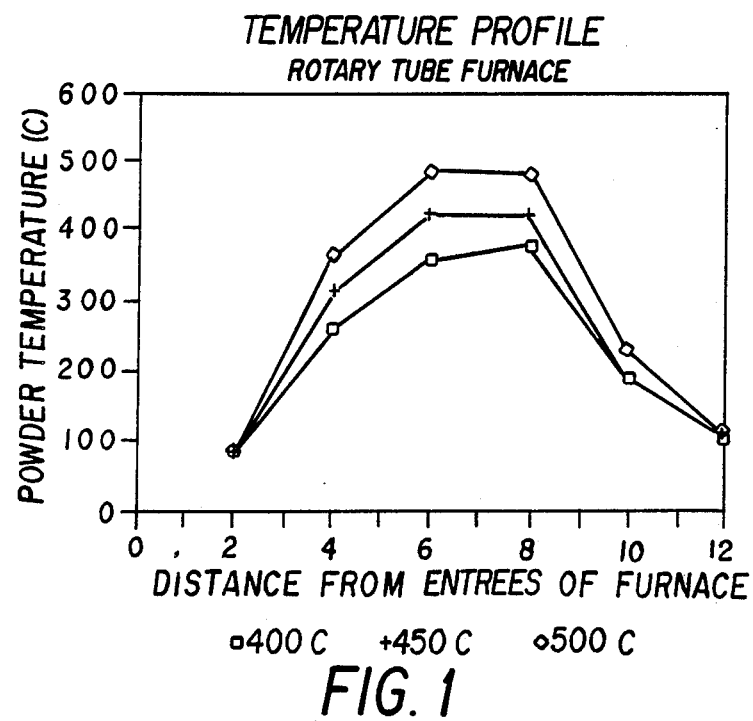
FIG. 1 is a plot of temperature v. location in rotary tube for three different heat treatment temperatures.

The temperature profile of manganese dioxide passing through the tube will be discussed with reference to the following experiment. Three separate heat treatments at 400° C., 450° C., and 500° C. were carried out. For each treatment the following procedure was used. All three heating zones were set to the same temperature. Manganese dioxide was fed through the tube at a rate of 0.6 pounds per minute. The angle of decline was one degree and the tube was rotated at 3 RPM which resulted in a velocity of about 0.2 feet per minute of powder through the tube. Generally, when the furnace is started from ambient it takes about 2-3 hours to come to a steady state condition. This condition is achieved when thermal equilibrium is reached between the heating elements, the tube, and the manganese dioxide. Thermocouples are placed every two feet down the length of the tube so that they are embedded in the manganese dioxide powder as it flows through the tube. The steady state is achieved when each thermocouple indicates a non-fluctuating temperature. FIG. 1 shows the steady state temperature profile down the length of the tube for the three heat treatment temperatures. Each of the heat treatments was run for about two hours after reaching steady state in order to collect sufficient material for analysis. As the FIG. 1 shows, the heat treatment temperature is reached in the third zone located between 6 and 8 feet down the tube. Thus, the manganese dioxide is heated for about 10 minutes at the maximum heat treatment temperature of the particular run. It is believed that the gamma to beta crystal phase conversion begins around 350° C. and FIG. 1 shows that the time above this temperature is longer than 10 minutes. Table 1 shows the various time periods for the three heat treatment temperatures.

TABLE 1

| | Temperature (°C.) | | |
| --- | --- | --- | --- |
| | 400 | 450 | 500 |
| time to reach 350° C. | 26 | 21 | 18 |
| time above 350° C. | 13 | 19 | 24 |
| time at maximum temp. | 10 | 10 | 10 |
| % beta | 40 | 60 | 87 |

Table 1 demonstrates that a higher heating zone temperature will give a faster rise time to the beta conversion temperature (350° C.) and will also result in a longer time above that temperature when compared to a lower temperature at the same throughput of material. Therefore, the total heat treatment time can be minimized by maintaining the heating zones at temperatures above about 450° C. If temperatures as high as 500° C. are used care must be taken to avoid heat treatment periods which will be long enough to form lower oxides of manganese. While the 60 minute run at 500° C. did not show any lower oxide formation, as determined by X-ray analysis, a similar run for 105 minutes did show some lower oxides present. The Figure also shows that the manganese dioxide does not reach the temperature of the heating zones. Therefore, the heating zones need to be set at a temperature slightly above the desired heat treatment temperature in order to reach that temperature.

The material obtained from each of the three heat treatments discussed above is analyzed for the % beta conversion. This analysis is done using X-ray diffraction in the following manner. A sample of each powder is taken and the X-ray diffraction pattern is determined using Cu Kα radiation. A monochrometer is placed between the sample and a scintillation detector to remove fluorescent radiation. The 110 reflection is used in the % beta determination by comparing the number of counts at this reflection for the sample to the number of counts at this reflection for an external standard known to be 100% beta. A ratio of the counts gives the % beta for the sample.

For manganese dioxide to have adequate performance as a cathode active material in a lithium battery the % beta should be at least 60% but less than 90%. Outside of this range the cathode utilization is inferior to the utilization of material within this range. It is preferred the the % beta be between about 65% and 85%. Table 1 shows the % beta conversion at the three temperatures. Each value given represents an average of three different samples taken from the same run. The data shows that a $t_h$ of 19 minutes is sufficient to convert gamma manganese dioxide to about 60% beta when the heating zones are set at 450° C. This is adequate conversion for use as cathode active manganese dioxide in a non-aqueous cell. While 400° C. is an adequate heat treatment temperature using the long prior art time periods, it is not an adequate temperature for the short times of the present invention as indicated by the 40% beta conversion.

Figure 2:
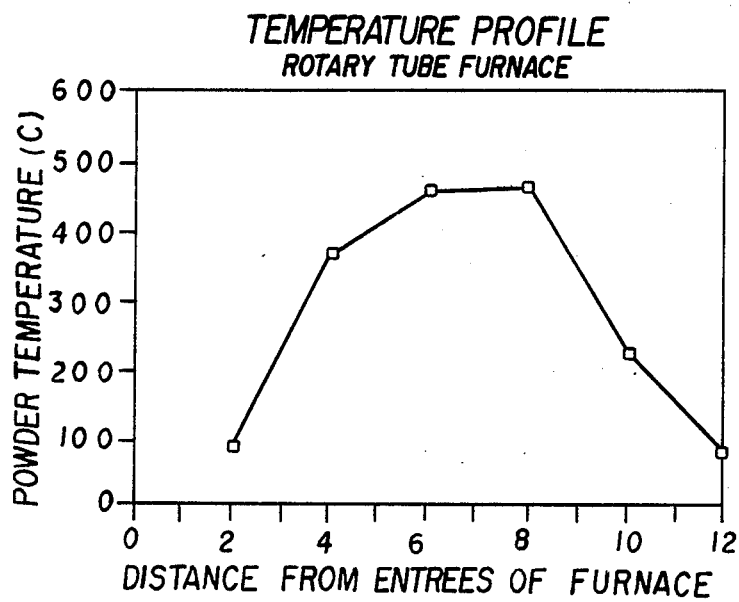
FIG. 2 is a plot of temperature v. location in the rotary tube for a furnace temperature of 475° C.

The benefit of the present invention is that it provides a continuous process for converting large quantities of gamma manganese dioxide to the beta phase in shorter time periods than the processes taught by the prior art without the formation of deleterious lower oxides. What follows is a discussion of an extended production run of 48 hour duration which demonstrates a preferred mode of operation. The heating zones were each set at 475° C. The tube angle was one degree and the rate of rotation was 3 RPM. The feedrate was 0.6 pounds per minute and the time for passage down the entire length of the tube was 55 minutes. It took about two hours to reach the steady state condition. The manganese dioxide collected during this period was scrapped. The heat treatment then proceeded continuously for 46 hours with samples collected periodically throughout the run. Thermocouples were located every two feet down the length of the tube and the temperature profile of the manganese dioxide is shown in FIG. 2. The maximum temperature reached was about 470° C. and the manganese dioxide was heated between 450°-470° C. for about 10 minutes.

At the end of 46 hours about 1600 pounds of the beta manganese dioxide had been collected. The average % beta of the samples taken throughout the run was about 80% beta. The x in $MnO_x$ indicates the oxidation state of manganese. Gamma manganese dioxide has x=1.95 before heat treatment due to the presence of other manganese species. The value of x was determined by chemical analysis for the material prepared according to the present invention and it was found to be 1.95 which indicates no decomposition had occurred. By way of comparison, the prior art method of batchwise heating at 350° C. produced 190 lbs of about 75% beta manganese dioxide in a 24 hour heat treatment period. The present invention, as described immediately above, produces 864 pounds in the same period. Thus, more than a fourfold increase in production of cathode quality beta manganese dioxide was obtained by the present invention under the above conditions. For temperatures above 450° C. it is possible to decrease $t_h$ and thus the production rate could be higher.

Figure 3A:
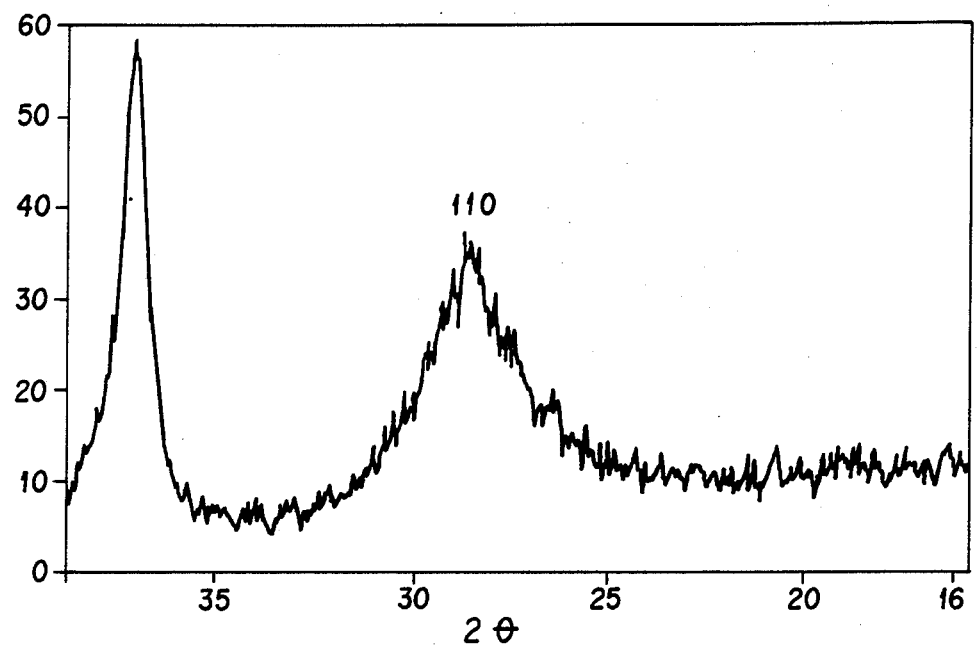
FIG. 3A is an X-ray diffraction pattern of manganese dioxide heat treated according to the present invention.
Figure 3B:
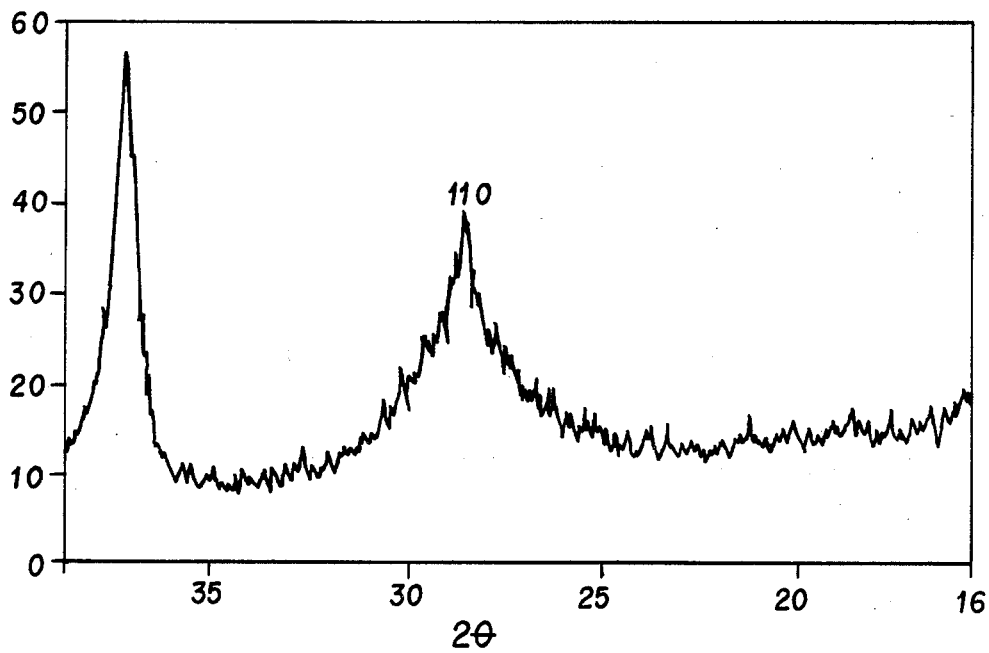
FIG. 3B is an X-ray diffraction pattern of manganese dioxide heat treated according to the prior art method.

FIGS. 3A and 3B show the X-ray diffraction patterns of beta manganese dioxide prepared according to the present method (FIG. 3A) and the prior art method described immediately above (FIG. 3B). The diffraction patterns were obtained using Cu Kα radiation and scanning the 2θ angle from 15 to 40 degrees. The position of the 110 reflection is due to lattice spacing of the beta phase. The prior art material was 81% beta and the material made in accordance with the present invention was 82% beta. The diffraction patterns are virtually identical which confirms that the present invention provides similar material to that made by prior art methods. The absence of any reflections at about 33 degrees indicates the absence of any expected lower oxides.

The % beta conversion can be increased by holding the manganese dioxide at the heat treatment temperature for longer than 10 minutes. However, for a given heat treatment temperature a majority of the beta conversion takes place in the first ten minutes. For example, in the 450° C. heat treatment discussed above the beta conversion is about 60% in the first ten minutes and increases to only 65% when heated for a total of 90 minutes. Therefore, the % beta is increased faster by heating at a higher temperature than by heating longer at a lower temperature. According to the present invention it is possible to heat treat the manganese dioxide for up to one hour above 450° C. but is preferred to heat for no more than 30 minutes at a heat treatment temperature above 450° C.

As discussed above, in order to minimize the total heat treatment period it is desirable to minimize $t_r$. In the above described heat treatments, $t_r$ was generally less than 1 hour. It would not be detrimental to the beta manganese dioxide ultimately formed if this period was longer than 1 hour because lower oxides do not form at the temperatures which are reached during this period. However, it is preferred that $t_r$ not exceed one hour in order to maximize the throughput of manganese dioxide.

Following the heat treatment of gamma manganese dioxide to the beta phase a cathode can be prepared in a conventional manner. For example, the heat treated manganese dioxide is combined with a conductive agent and a binder. The admixture is then formed into the desired cathode structure. For a button cell the cathode is formed by pressing the admixture into a disc shape and the disc is pressed into the cathode can of the button cell. For a spirally wound cell the admixture is applied to both sides of a conductive metal grid and compressed between rollers to obtain proper adherence. A long, thin cathode is obtained which can be spirally wound together with an anode and separator.

The conductive agents suitable for use include any of those conductive agents conventionally employed in the art for producing positive electrodes for non-aqueous cells and includes acetylene black and carbon black. The binders for use in the process are also materials known in the art for preparing positive electrodes of manganese dioxide for non-aqueous cells and which are capable of providing sufficient binding properties. Suitable binders are fluoric resins including polytetrafluoroethylene, copolymers of tetrafluoroethylene and hexafluoropropylene, copolymers of tetrafluoroethylene and ethylene and chlorotrifluoroethylene.

After the cathode is formed it is subjected to a heat treatment to remove absorbed water. This heat treatment is generally done between 150°–300° C. and can be done in dry air or under vacuum. Following this heat treatment the dried cathodes are assembled into cells.

An admixture is prepared that is 91% of the above described heat treated beta manganese dioxide, 6% carbon, and 3% polytetrafluoroethylene. The admixture is coated on both sides of an expanded, stainless steel grid and the coated grid is compressed between rollers. Cathodes thus prepared are heat treated at 200° C. under vacuum. The dried cathodes are spirally wound together with an anode comprised of lithium foil and a separator comprised of microporous polypropylene. The spirally wound electrode stack is inserted into a cylindrical can. A conventional non-aqueous electrolyte is dispensed into the can and a cover is crimped in place. Each electrode has a tab connected thereto. One tab connects to the can and the other tab connects to the cover, said can and cover functioning as the electrode terminals.

Such cells, having cathode active, beta manganese dioxide made in accordance with the present invention, have electrical discharge characteristics similar to cells having manganese dioxide heat treated according to the prior art methods. Thus, the rapid heating of the present invention does not adversely effect the electrochemical properties of the manganese dioxide.

Variations, which are within the scope of the present invention, can be made to the above described heat treatment process. For example, the gamma manganese dioxide could be separately pre-heated up to about 300° C. before introduction into the rotary tube. This would shorten the overall residence time of the manganese dioxide in the heating zone and increase the rate of production. The heat released by the manganese dioxide in the cool down zone of the tube could be transferred and used in the preheat for a more efficient use of energy. An efficient heat removal in the cool down zone could also serve to shorten the overall process time.

Rotary kiln technology is well known and there is an equation which describes the relationship between between the angle of decline, the rate of rotation, and the residence time in the tube:

$$T = (KL)/(DR \tan(A))$$

where T is the time of passage, K is a constant, L is the length of the tube, D is the diameter of the tube, R is the RPM rotation, and A is the angle of the tube. Thus, while an angle of one degree and a rotation of 3 RPM was used above, other angles and rates of rotation could be used to provide the same residence time or different residence times. Further, while the feed rate of manganese dioxide is preferred to be between 0.1 and 1.0 pounds per minute for the above described rotary tube furnace, it can be operated at rates up to about 3 pounds per minute. Much larger rates can be used with furnaces larger than the one described herein.

The rotary tube furnace described above is comprised of a tube having an essentially smooth inner surface. The inner surface could be modified to provide better mixing of the manganese dioxide powder. For example, longitudinal fins could be provided at a 90 degree spacing down the length of the tube. The fins would function as lifters which would pick the manganese dioxide up higher than occurs with the smooth surface and pour the powder back toward the center of the tube. Another embodiment would be to have a corrugated inner surface which would entrain material during rotation and pour it back into the tube center.

Gamma manganese dioxide contains up to 5% water as received from the manufacturer. During the heat treatment most of this water is removed and a means for its escape from the furnace must be provided. An additional function of the decline of the rotary tube is to provide a "chimney effect" so that the water vapor escapes from the upper end of the tube. To assist in the water vapor removal an inert gas could be passed from the lower end to the upper end of the tube. However, the rate of gas flow should not be so great that manganese dioxide particles are entrained and carried up the tube.

There exists means other than a rotary tube furnace which could rapidly heat manganese dioxide. For example, a fluidized bed through which heated air is passed would provide rapid heating. In this process the gamma manganese dioxide powder is conveyed into the fluidized bed chamber. A rapid, upward flow of hot air disperses the powder into a fluidized bed and heats the powder to the heat treatment temperature in a short period of time. The powder remains in the chamber for a time sufficient to obtain the beta conversion and then the converted powder is collected and conveyed out of the chamber to cool down. Heating methods such as this are amenable to either continuous or batch operation.

Other variations can be made to the above described process and remain within the scope of the present invention. The specific descriptions given above relating to the method of this invention are for illustrative purposes and are not intended to limit the scope of the invention as claimed.

What is claimed is:

1. An improved process for producing beta manganese dioxide comprising feeding particulate gamma manganese dioxide into a chamber, continuously changing the relative positions of the $MnO_2$ particles in said chamber while heating the gamma manganese dioxide to at least 450° C., holding the temperature of the manganese dioxide at at least 450° C. for a time to convert a majority of the manganese dioxide to a beta crystal phase without forming detrimental amounts of lower oxides, and removing the heat treated manganese dioxide from the chamber.

2. The process of claim 1 wherein the manganese dioxide is heated to at least 450° C. in up to one hour and holding the temperature of the average manganese dioxide particle at a temperature of at least 450° C. for up to one hour.

3. The process of claim 1 wherein the gamma manganese dioxide is heated to at least 465° C. for up to one hour, and holding the temperature of the manganese dioxide at at least 465° C. for up to 30 minutes in order to convert a majority of the manganese dioxide to a beta phase.

4. The process of claim 2 wherein the manganese dioxide is continuously fed through the chamber.

5. The process of claim 4 wherein the gamma manganese dioxide is fed into the chamber at a rate of between 0.1 and 3.0 pounds per minute.

6. The process of claim 3 wherein the gamma manganese dioxide is preheated to up to 300° C. before feeding said manganese dioxide into the chamber.

7. The process of claim 3 wherein the heat treated manganese dioxide is 60-90% beta crystal phase.

8. An improved process for producing manganese dioxide cathodes suitable for use in non-aqueous cells comprising continuously feeding gamma manganese dioxide into a rotary tube furnace heated to at least 450° C., rotating the tube, heating the manganese dioxide to at least 450° C. during a period of up to one hour in a first portion of the tube, holding the temperature of the manganese dioxide at at least 450° C. for up to one hour in a second portion of the tube in order to convert a majority of the manganese dioxide to a beta phase, cooling the manganese dioxide in a third portion of the tube, and collecting the heat treated manganese dioxide.

9. The process of claim 8 wherein the manganese dioxide is heated to at least 465° C. for up to one hour in the first portion of the tube and the manganese dioxide is held at at least 465° C. for up to 30 minutes in the second portion of the tube.

10. The process of claim 9 wherein the manganese dioxide is held at at least 465° C. for up to 15 minutes.

11. The process of claim 8 wherein between about 60% and 90% of the gamma manganese dioxide is converted to the beta crystal phase.

12. The process of claim 8 wherein between about 65% and 85% of the gamma manganese dioxide is converted to the beta crystal phase.

13. The process of claim 9 wherein the manganese dioxide is fed into the rotary tube furnace at between 0.1 and 3.0 pounds per minute.

14. The process of claim 9 wherein the manganese dioxide is preheated to a temperature up to 300° C. before it is fed into the rotary tube furnace.

15. The process of claim 11 further comprising forming an admixture of the heat treated manganese dioxide, a conductive agent, and a binder; coating the admixture onto an expanded metal grid; compressing the coated grid between rollers to form a cathode; and heating the cathode between 150° and 300° C. to remove absorbed moisture.

16. The process of claim 15 wherein the conductive agent is selected from carbon black, acetylene black, and mixtures thereof and the binder is polytetrafluoroethylene.

* * * * *